June 14, 1949.  R. W. THOMAS  2,472,993
MEANS FOR DELIVERING BREAD
Filed Aug. 14, 1946
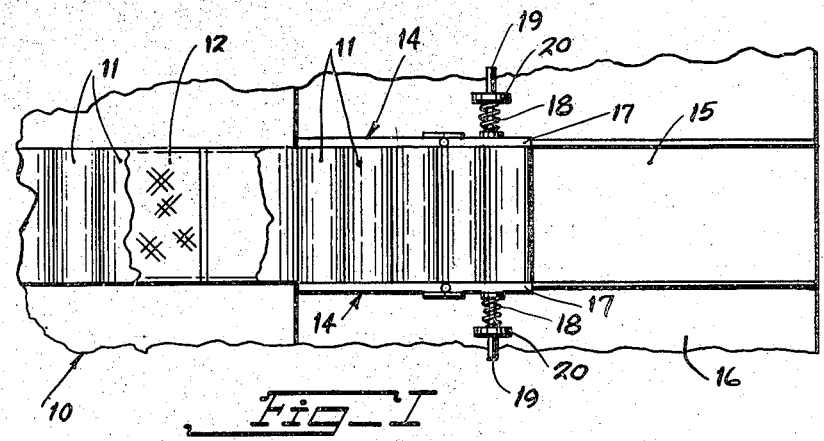
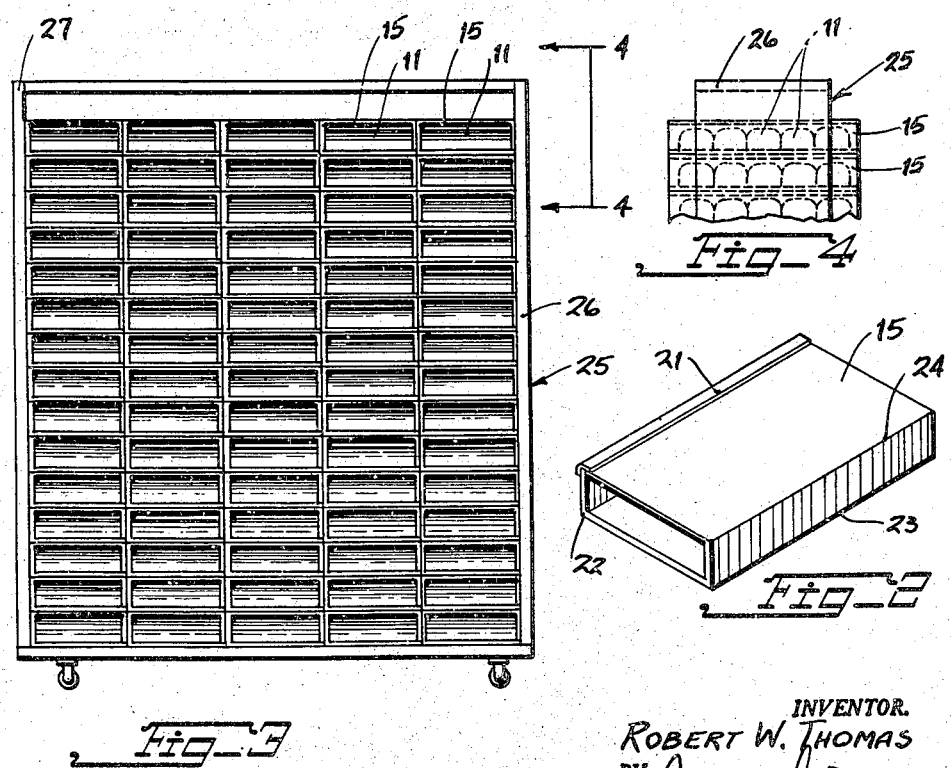
INVENTOR.
ROBERT W. THOMAS
BY
ATTORNEY.

Patented June 14, 1949

2,472,993

UNITED STATES PATENT OFFICE 2,472,993

MEANS FOR DELIVERING BREAD

Robert W. Thomas, Larchmont, N. Y., assignor to Quality Bakers of America Cooperative, Inc., New York, N. Y., a corporation of New York Application August 14, 1946, Serial No. 690,579

1 Claim. (Cl. 211—49)

This invention relates to means for delivering bread.

At the present time when bread is delivered from the wrapping machines of large bakeries to display positions on the shelves, counters or other places in retail stores, it undergoes manual handling several times in the process. The bread is manually handled as it is removed from the wrapping machines and placed in containers, conveyors, or depositories. It is again manually handled as it is removed from the containers, conveyors or depositories and placed in baskets or manually carried to shelves, counters or other places, and so on. The bread also receives rough treatment in transit where it is sometimes stood endwise in the containers or depositories and becomes deformed because it is soft and fresh, and also because it is loose and bounces around. When the bread is finally on the shelf, counter or other place in the retail establishment its wrapper is crumpled and often torn. The public would reluctantly buy any other product in this condition because they would think that it appeared shopworn. However, it is taken for granted that bread must look so mussed when purchased.

This invention particularly proposes means for delivering bread which will place the bread in a retail establishment in the same condition in which it left the wrapping machines. It will look fresh and unhandled and will attract buyers who will prefer it to the shopworn loaves now being sold.

In order to accomplish the new delivery of bread, use is made of a carrying device for the loaves, while a new method of delivery is proposed for eliminating all manual handling of the loaves of bread. It is proposed to characterize the delivery device by the fact that it consists of a corrugated paper or other tube of appropriate size open at each end, with the material forming the tube taped along one corner, or otherwise suitably fastened. A tube of this character is capable of holding a plurality of loaves of bread. It is proposed that the tubes be placed in the lines of loaves of newly baked bread issuing from the ends of the wrapping machines. The loaves are swept into the tubes without manually touching them. It is proposed that the filled tubes be placed on racks which are loaded into the delivery trucks and thus taken to the points of delivery where the filled tubes are removed from the trucks and carried to display positions where the loaves are slid out of the tubes into display positions on a shelf, counter, or other place without being manually handled.

It is another object of this invention to so construct the new delivery tube that it may readily be adapted to existing equipment in bakery plants. This will eliminate costly reconversion of present equipment.

Another object of this invention is to construct the new delivery tube so simply that it may be easily manufactured at a low cost.

A still further object of the invention resides in so constructing the new delivery tube that it will readily collapse after the loaves of bread have been removed so that it occupies little space in the truck when empty. The new delivery tube is so constructed that it will be of no use to a bread dealer and for this reason will not be retained by the dealer and may be reused a multiplicity of times for bread delivery.

A further object of the invention resides in so constructing the new delivery tube and the racks upon which they are racked as to simplify the shelving arrangement within the truck body and eliminate the use of baskets for carrying the loaves from the truck to their display positions in a retail establishment.

Another advantage of the new delivery tube and the new method for delivering bread is that the entire set-up may readily be used as an advertising medium to sell more bread which is delivered by the new means and method. The bread loaves may be advertised as not manually touched during baking, wrapping and delivery to the retail outlets. Furthermore, they will look untouched.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a fragmentary plan view of the delivery end of a bread wrapping machine to which one of the new delivery tubes has been associated to teach one of the steps in the new method of delivering bread.

Fig. 2 is a perspective detailed view of one of the new bread delivery tubes.

Fig. 3 is an elevational view of an open rack filled with bread delivery tubes containing loaves of bread in accordance with this invention.

Fig. 4 is a fragmentary end view looking in the direction of the line 4—4 of Fig. 3.

In Fig. 1 the reference numeral 10 generally indicates the delivery end of a bread wrapping machine in which the loaves of bread 11 are being discharged by an endless conveyor 12 in a line. A guide 14 is associated with the delivery end 10 for funneling and guiding the loaves of bread into a new carrying tube 15. This carrying tube 15 is rested upon a table 16 which is aligned to hold the tube 15 at a proper elevation so that the line of discharging loaves 11 may enter the tube 15. The funneling guide 14 is provided with hingedly mounted funneling ends 17 which are resiliently urged towards the ends of the loaves 11 by expansion springs 18. These springs 18 are mounted on rods 19 which are slidable through studs 20 mounted on the table 16. It is important that the loaves of bread be funneled into the delivery tube 15 without damage to their wrappers.

The delivery tube 15 is in the nature of a corrugated paper or other tube of appropriate dimensions to receive a plurality of loaves of bread. It is open at each end. It is formed from a strip of corrugated paper or other material which is bent to form the tube and which has its ends connected with tape 21, or otherwise, along one corner of the tube. This tape 21, or other connecting means, is arranged externally of the tube so as not to form an obstacle which could possibly break or damage the bread wrappers.

It is proposed that the tube 15 be formed with its corners 22, 23 and 24 creased an amount which does not break the inherent resiliency of the corrugated material from which the tube is formed. The tube 15 will therefore have a tendency to collapse diagonally. It may be flattened completely by allowing it to collapse and by pressing it down. When the tube 15 is aligned with the line of loaves coming from the delivery end of the wrapping machine, it is necessary that the tube be squared up. Its sides must be held vertical so that the loaves may readily enter. It is important that the collapsible tube 15 be maintained in the squared up position until the loaves are discharged at a delivery point, for if the tube 15 were allowed to partially collapse it would rest against the soft fresh loaves of bread and deform them.

The tubed loaves of bread are stacked in an open rack 25 which has at least one of its dimensions a multiple of one of the dimensions of the tube 15. More particularly, the rack 25 has its sides 26 and 27 spaced from each other a distance equal to a multiple of the width of the tube 15. As illustrated in Fig. 3, the multiple is five. Five of the tubes 15 fit exactly between the sides 26 and 27. Consequently the sides 26 and 27 of the rack 25 will hold the tubes 15 square. The rack 25 may be placed on a delivery truck for delivering the loaves of bread. An alternative way would be to deliver the tubed loaves to a truck having its body of a dimension which is a multiple of the tube dimension. The truck body could then be used to hold the tubes square.

The operation of the invention may better be understood from the following description:

The means for delivering bread, in accordance with this invention, makes use of a plurality of delivery tubes 15 and associated racks 25 or equivalent means upon which the filled tubes 15 may be racked. The method of making deliveries consists in placing a delivery tube 15 in the line of the loaves of bread 11 issuing from the delivery end 10 of the bread wrapping machine. A group of the loaves 11 are moved or swept into the tube 15. The filled tube 15 is placed on the delivery rack 25. The operation is repeated with additional tubes 15 until the delivery rack 25 is full. The delivery rack 25 is then placed upon a delivery vehicle. An alternate way would be to place the tubed loaves directly into a delivery vehicle. At the points of delivery the tubed loaves are removed and the loaves are slid out to desired positions without manually touching them.

The new method of filling the tubes may be carried out manually, though of course it is preferable that automatic, or semi-automatic equipment be provided for this purpose. For this equipment to operate, in accordance with this invention, it would be necessary for it to mechanically fill the tubes 15, as the tubes 15 are manually or mechanically placed in position and removed from position after being filled. The tubes 15 in collapsed form may be manually or automatically supplied and positioned in squared up position, in the line of loaves of bread issuing from the end of the wrapping machine.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

Means for delivering freshly baked soft loaves of bread, comprising a plurality of tubes each being rectangular in cross section and of a width and height to accommodate one loaf of bread positioned with its ends snugly against the sides of said tube and of a length to accommodate a plurality of loaves of bread and having diagonally opposite corners foldable for folding the tubes flat when not in use and said opposite corners having inherent resiliency requiring that each tube be held in rectangular shape or it will fold closed, and means for receiving said tubes in a plurality of horizontal layers comprising a base with upright sides at the ends thereof perpendicular to said base, the upright sides being spaced a distance which is a multiple of the outside widths of said tubes for holding and supporting said tubes in rectangular shapes in order to hold them from deforming the ends of said loaves of bread.

ROBERT W. THOMAS.

REFERENCES CITED

The following references are of record in the file of this patent:

UNITED STATES PATENTS

| Number | Name | Date |
|---|---|---|
| 1,069,253 | Heneberch | Aug. 5, 1913 |
| 1,160,760 | Rexford | Nov. 16, 1915 |
| 1,415,075 | Wilbur | May 9, 1922 |
| 1,555,045 | Walter | Sept. 29, 1925 |
| 1,694,520 | Sturdavant | Dec. 11, 1928 |
| 1,731,111 | Romer | Oct. 8, 1929 |
| 2,015,283 | Pashley et al. | Sept. 24, 1935 |
| 2,084,922 | Sidebotham | June 22, 1937 |
| 2,197,510 | Ringler | Apr. 16, 1940 |
| 2,247,341 | Anderson | June 24, 1941 |
| 2,329,800 | Warren | Sept. 21, 1943 |
| 2,348,509 | Wheeler | May 9, 1944 |
| 2,380,427 | Gilfillan | July 31, 1945 |
| 2,424,355 | Goldman | July 22, 1947 |